United States Patent [19]
Mansouri et al.

[11] Patent Number: 5,715,282
[45] Date of Patent: Feb. 3, 1998

[54] METHOD AND APPARATUS FOR DETECTING INTERFERENCE IN A RECEIVER FOR USE IN A WIRELESS COMMUNICATION SYSTEM

[75] Inventors: Mack Mansouri, Wheeling, Ill.; Richard Bontrager, Overland Park, Kans.

[73] Assignee: Motorola, Inc., Schaumburg, Ill.

[21] Appl. No.: 643,430

[22] Filed: May 8, 1996

[51] Int. Cl.$^6$ ................................. H04B 1/10
[52] U.S. Cl. ........................... 375/350; 455/307
[58] Field of Search ..................... 375/350, 346; 455/296, 307, 309, 312, 63; 364/724.01, 724.11

[56] References Cited

U.S. PATENT DOCUMENTS

| | | | |
|---|---|---|---|
| 4,761,829 | 8/1988 | Lynk, Jr. et al. | 455/307 |
| 5,142,551 | 8/1992 | Borth et al. | 375/219 |
| 5,148,548 | 9/1992 | Meche et al. | 455/63 |
| 5,287,556 | 2/1994 | Cahill | 455/266 |
| 5,339,445 | 8/1994 | Vogt et al. | 455/266 |
| 5,396,657 | 3/1995 | Jokinen | 455/307 |
| 5,493,717 | 2/1996 | Schwarz | 455/307 |
| 5,499,394 | 3/1996 | Kaatz et al. | 455/307 |

*Primary Examiner*—Stephen Chin
*Assistant Examiner*—T. Ghebretinsae
*Attorney, Agent, or Firm*—Jeffrey G. Toler

[57] ABSTRACT

An apparatus for use in a receiver (100) of a wireless communication system is provided. The apparatus comprises a first filter (340) having a first cutoff frequency, a second filter (350) having a second cutoff frequency, a first data bit estimator (360) coupled to the first filter (340), a second data bit estimator (361) coupled to the second filter (350), a third data bit estimator (363), and decision logic (370) dynamically selecting one of the first and second filters based on a first bit count from the first data bit estimator (360), a second bit count from the second data bit estimator (361), and a third bit count from the third data bit estimator (363).

17 Claims, 2 Drawing Sheets

5,715,282

METHOD AND APPARATUS FOR DETECTING INTERFERENCE IN A RECEIVER FOR USE IN A WIRELESS COMMUNICATION SYSTEM

FIELD OF THE INVENTION

The present invention relates generally to communication systems, and more particularly to detecting interference in a receiver in a wireless communication system.

BACKGROUND OF THE INVENTION

Receivers in wireless communication systems are used to detect radio frequency (RF) signals transmitted over a transmission medium such as air. Since a desired RF signal is transmitted over the same transmission medium as many other RF signals, the other RF signals may interfere with detection of the desired RF signal. Examples of interference caused by interfering signals in a wireless communication system, such as a digital cellular communication system, include adjacent channel interference and cochannel interference. In receivers for use in wireless communication systems it would therefore be desirable to improve detection of a desired signal by reducing the receiver's sensitivity to interference such as adjacent channel and cochannel interference. In order to reduce sensitivity of the receiver to such interference it would also be desirable if the receiver could detect such interference.

Accordingly, there exists a need for a method and apparatus for detecting interference in a receiver in a wireless communication system.

SUMMARY OF THE INVENTION

In order to address this need, the present invention provides an interference detection apparatus and method for use in a receiver of a wireless communication system. According to a first aspect of the present invention, the apparatus includes a first filter having a first cutoff frequency, a second filter having a second cutoff frequency, a first data bit estimator coupled to the first filter, a second data bit estimator coupled to the second filter, a third data bit estimator, and decision logic responsive to the first, second, and third data bit estimators. The decision logic dynamically selects one of the first and second filters based on a first bit count from the first data bit estimator, a second bit count from the second data bit estimator, and a third bit count from the third data bit estimator.

In accordance with another aspect of the present invention, the apparatus includes a receiver in a wireless communication system. The receiver comprises an antenna, a frequency downconverter responsive to the antenna, a demodulator responsive to the frequency downconverter, an analog to digital converter responsive to the demodulator, and an interference detection module responsive to the analog to digital converter. The interference detection module comprises a first digital filter, a second digital filter, a first data bit estimator responsive to the first filter, a second data bit estimator responsive to the second filter, a third data bit estimator, and decision logic. The decision logic selects one of the first and second filters based on a first bit count from the first data bit estimator, a second bit count from the second data bit estimator, and a third bit count from the third data bit estimator.

The method of detecting interference includes the steps of: receiving a signal having a training data sequence; decoding the received signal in a first mode using a first filter to produce a first estimated training data sequence; decoding the received signal in a second mode using a second filter to produce a second estimated training data sequence; comparing a predetermined training data sequence with the first estimated training data sequence to produce a first bit count; comparing the predetermined training data sequence with the second estimated training data sequence to produce a second bit count; and selecting one of the first and second filters based on the first and second bit counts.

The invention itself, together with its attendant advantages, will best be understood by reference to the following detailed description, taken in conjunction with the accompanying drawings.

DETAILED DESCRIPTION OF THE PREFERRED EMBODIMENT(S)

Figure 1:
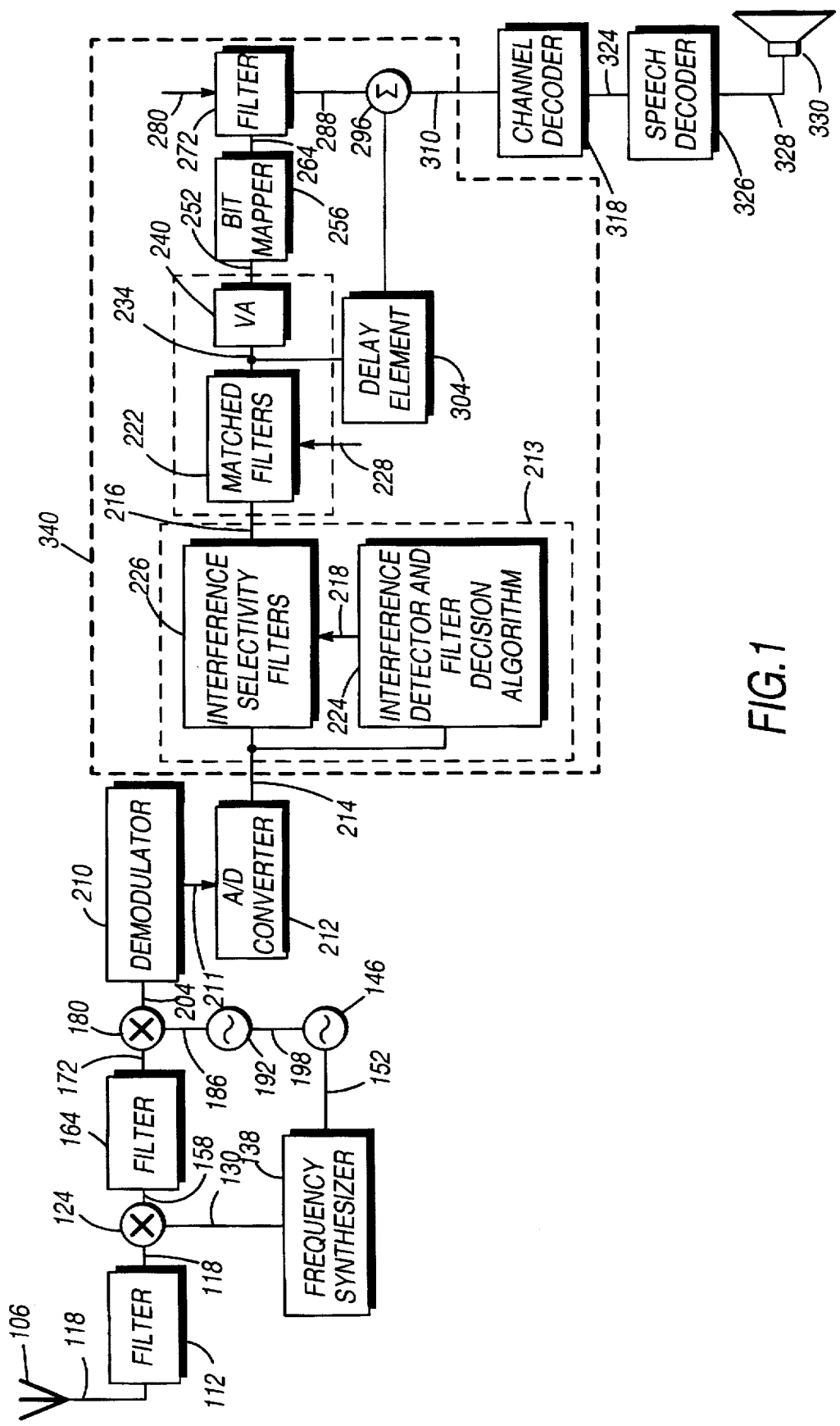
FIG. 1 is a block diagram of a receiver.

FIG. 1 illustrates a receiver 100 which uses an interference detector 213 as a portion thereof. Receiver 100 may be used as part of a wireless communication system, such as a cellular communication system, preferably a time division multiple access cellular communication system.

A signal transmitted over the air is received by antenna 106. The signal received by antenna 106 is supplied to filter 112 on line 118. Filter 112 filters the received signal and generates a filtered signal on line 118. Line 118 is coupled to mixer 124 which also receives an oscillating signal on line 130 from frequency synthesizer 138. Mixer 124 converts downward in frequency the signal supplied thereto on line 118, and generates a down-converted signal on line 158 which is supplied to filter 164. Filter 164 generates a filtered signal on line 172 which is supplied to a second mixer 180.

Mixer 180 additionally receives an oscillating signal input on line 186 supplied by oscillator 192. The oscillating frequency of oscillator 192 is controlled by the oscillating frequency of reference oscillator 146 and is coupled to oscillator 146 on line 198. Mixer 180 generates a second, down-converted signal on line 204 which is supplied to demodulator circuit 210.

Demodulator circuit 210 may, for example, comprise a quadrature demodulator when the signal transmitted to receiver 100 is comprised of a digitally modulated signal. Demodulator 210 generates a demodulated signal on line 211 which is supplied to and digitized by A/D converter 212. The resulting digitized signal from A/D converter is input to interference detection unit 213 and then fed to matched filter 222.

Interference detection unit 213 has an input 214 responsive to A/D 212 and an output 216 coupled to matched filter 222 and includes interference selectivity filters 226 and an interference detector and filter decision module 224. The interference filter selectivity module 226 includes a co-channel interference filter and an adjacent channel interference filter and selects one of these filters, or no filtering, based on a signal 218 from the detector and decision unit 224.

Matched filter 222 is an adaptive filter and is supplied with coefficients which are functions of a channel impulse response input on line 228. Matched filter 222 generates a signal on line 234 which is supplied to the Viterbi algorithm 240.

Viterbi algorithm 240 generates a hard decision signal on line 252 which is supplied to bit mapper 256. Bit mapper 256 converts the logical values of the binary data sequence supplied thereto into arithmetic form and generates an arithmetic data stream on line 264 which is supplied to adaptive filter 272. Adaptive filter 272 is preferably a nine-tap finite impulse response (FIR) filter which synthesizes portions of a multipath channel (i.e., the FIR filter synthesizes the multipath channel except for the direct path thereof), and is supplied with coefficients which are a function of the channel impulse response on line 280.

Filter 272 generates a signal on line 288 which is supplied to summer 296. Summer 296 additionally is supplied with a signal generated by filter 222 on line 234 delayed in time by delay element 204. Summer 296 generates a difference signal on line 310 which is supplied to a channel decoder 318 which, typically, comprises a soft-decision convolutional decoder. Decoder 318 decodes the soft-decision signal supplied thereto and generates a decoded signal on line 324 which is supplied to speech decoder 326. Speech decoder 326 generates a signal on line 328 which is supplied to a transducer such as speaker 330, to convert the decoded signal into human perceptible form.

Figure 2:
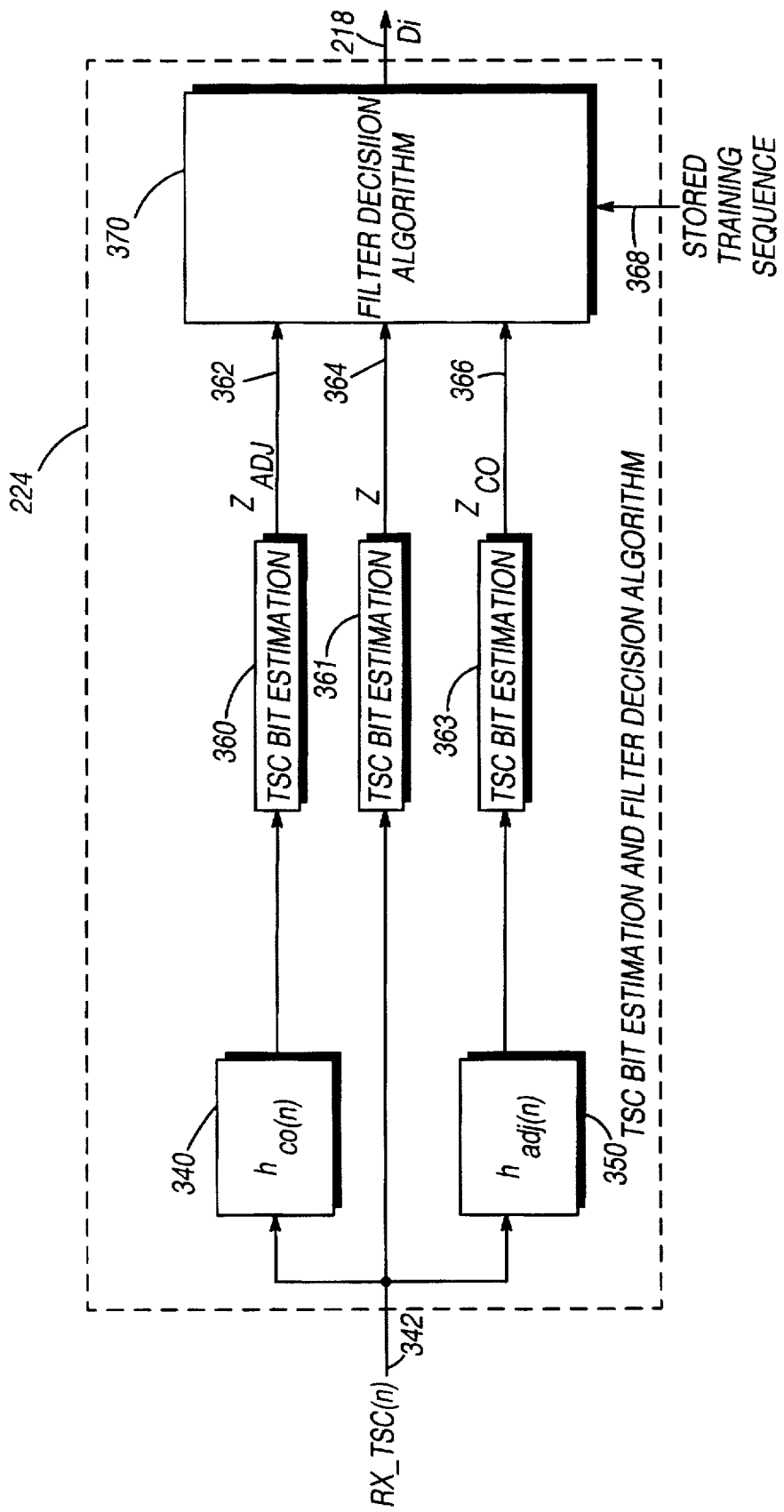
FIG. 2 is a block diagram of the interference detection module of FIG. 1.

Referring to FIG. 2, a more detailed diagram of the interference detector and filter decision unit 224 is illustrated. The interference detector and filter decision unit 224 includes an adjacent channel interference filter 340, a cochannel interference filter 350, a plurality of bit estimation units 360, 361, 363, and a filter decision algorithm unit 370. The interference detector and filter decision unit 224 has an input 342 receiving a training sequence, such as a predetermined binary pattern, derived in a known manner from the received signal 214 and produces a decision signal 218.

During operation, the received training sequence is input to the adjacent channel interference filter 340 and to the cochannel interference filter 350. The adjacent channel interference filter 340 is a filter having a first cutoff frequency designed to reduce adjacent channel interference, such as a digital 60 Khz 3 db bandwidth FIR filter, typically resulting from interference generated from a cell adjacent to the cell served by the receiver 100, and the cochannel interference filter 350 is a filter having a second cutoff frequency designed to reduce cochannel interference, such as a digital 120 Khz 3 db bandwidth FIR filter, typically resulting from interference within the cell served by the receiver 100. A first filtered signal output from the adjacent channel interference filter 340 is received by a first of the bit estimation units 360. A second of the bit estimation units 361 receives the unfiltered training sequence, and a third bit estimation unit 363 receives a second filtered signal output from the cochannel interference filter 350. The first bit estimation unit 360 produces a first estimated signal 362, the second bit estimation unit 361 produces a second estimated signal 364, and the third bit estimation unit 363 produces a third bit estimation signal 366. The bit estimated signals 362, 364, 366 are preferably generated by match filtering the received training sequence against a complex conjugate-time reversed channel impulse response.

It should be noted that if the second estimated signal 364 has a low number of correct training bits, e.g. less than 20 of 26 bits in a GSM application, then the first and third estimated signals 362, 366 are not produced since the reliability of the estimate is questionable. In this case, no change to the selected output signal 218 is made. Otherwise, the filter decision module 370 receives the first, second, and third estimated signals 362, 364, 366, and receives a stored training sequence 368. The filter decision module selects either an adjacent channel filter, a cochannel filter, or no filter based on a comparison between the stored training sequence 368 and the first, second, and third estimated signals 362, 364, 366.

In a particular embodiment, the filter decision module 370 obtains a correct bit count for the first, second, and third estimated signals, 362, 364, 366 by comparing each of the respective estimated signal 362, 364, 366 with the stored training sequence 368. A first differential averaged bit count is then generated by taking an average of the difference between the first correct bit count and the second correct bit count. Similarly, a second differential averaged bit count is computed by taking an average of the difference between the third bit count and the second bit count. If the first differential bit count is less than or equal to zero and the second differential averaged bit count is greater than zero, then the cochannel interference filter 350 is selected. If the first differential averaged bit count is greater than zero, and the second differential averaged bit count is less than or equal to zero, then the adjacent channel interference filter 340 is selected. Otherwise, no filter is selected. The selected filter is then communicated to the interference selectivity filter unit 226 via decision signal 218.

By adjusting the receiver's 100 bandwidth by dynamically selecting different filters, the receiver 100 has a reduced frame erasure rate yielding improved performance. The improved performance is especially important for a mobile operating in a high interference environment. In addition, by averaging the difference between the selectivity filter's correct bit count and the nominal correct bit count for all time slots that contain a desired signal, the receiver 100 is capable of detecting bit error rate decreases in a short amount of time, typically less then about 500 ms based on simulation results. Thus, the receiver 100 using the interference detection and filter decision module 213 detects and adapts to changes in the interference environment in real time.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. An interference detection apparatus for use in a receiver of a wireless communication system, the apparatus comprising:

a first filter having a first cutoff frequency;

a second filter having a second cutoff frequency;

a first data bit estimator coupled to the first filter;

a second data bit estimator coupled to the second filter;

a third data bit estimator; and decision logic responsive to the first, second, and third data bit estimators and dynamically selecting one of the first and second filters based on a first bit count from the first data bit estimator, a second bit count from the second data bit estimator, and a third bit count from the third data bit estimator.

2. The apparatus of claim 1, wherein the first filter comprises an adjacent channel interference reduction filter.

3. The apparatus of claim 1, wherein the decision logic receives a predetermined data sequence.

4. A receiver in a wireless communication system, the receiver comprising:

an antenna;

a frequency downconverter responsive to the antenna;

a demodulator responsive to the frequency downconverter;

an analog to digital converter responsive to the demodulator; and an interference detection module responsive to the analog to digital converter, the interference detection module comprising:

a first digital filter;

a second digital filter;

a first data bit estimator responsive to the first filter;

a second data bit estimator responsive to the second filter;

a third data bit estimator; and decision logic selecting one of the first and second filters based on a first bit count from the first data bit estimator, a second bit count from the second data bit estimator, and a third bit count from the third data bit estimator.

5. The receiver of claim 4, wherein the first digital filter comprises an adjacent channel interference filter and the second digital filter comprises a cochannel interference filter.

6. The receiver of claim 4, wherein the decision logic receives a predetermined sequence of data.

7. The receiver of claim 6, wherein the predetermined sequence of data comprises a training sequence.

8. A method of detecting interference comprising the steps of:

receiving a signal having a training data sequence;

decoding the received signal in a first mode using a first filter to produce a first filtered signal;

based on the first filtered signal, determining a first estimated training data sequence;

decoding the received signal in a second mode using a second filter to produce a second filtered signal;

based on the second filtered signal, determining a second estimated training data sequence;

comparing a predetermined training data sequence with the first estimated training data sequence to produce a first bit count;

comparing the predetermined training data sequence with the second estimated training data sequence to produce a second bit count; and selecting one of the first and second filters based on the first and second bit counts.

9. The method of claim 8, further comprising the step of comparing the first bit count to a nominal bit count to form a first differential bit count.

10. The method of claim 9, further comprising the step of comparing the second bit count to the nominal bit count to form a second differential bit count.

11. The method of claim 10, further comprising the step of selecting one of the first and second filters based on the first and second differential bit counts.

12. The method of claim 9, wherein the nominal bit count is determined by comparing a nonfiltered estimated training data sequence and the predetermined training data sequence.

13. The method of claim 8, wherein the received signal is transmitted over a time slot of a time division multiple access communication system.

14. The method of claim 8, wherein the first filter comprises a cochannel interference reduction filter.

15. The method of claim 8, wherein the second filter comprises an adjacent channel interference reduction filter.

16. The method of claim 11, wherein the first filter is selected when the first deferential bit count is greater than zero and the second differential bit count is less than or equal to zero.

17. The method according to claim 9, wherein one of the first and second estimated training data sequences are produced using a bit estimation device.

* * * * *